US010567246B2

(12) United States Patent
Randolph et al.

(10) Patent No.: US 10,567,246 B2
(45) Date of Patent: Feb. 18, 2020

(54) PROCESSING PERFORMANCE DATA OF A CONTENT DELIVERY NETWORK

(71) Applicant: AT&T INTELLECTUAL PROPERTY I, L.P., Atlanta, GA (US)

(72) Inventors: Henry Randolph, Hueytown, AL (US); James Gordon Beattie, Jr., Bergenfield, NJ (US); Nicholas Coduto, Wayne, IL (US); Roque Rios, Middletown, NJ (US); Charles M. Stahulak, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 860 days.

(21) Appl. No.: 14/970,179

(22) Filed: Dec. 15, 2015

(65) Prior Publication Data

US 2017/0171040 A1    Jun. 15, 2017

(51) Int. Cl.
G06F 16/00 (2019.01)
H04L 12/26 (2006.01)
H04W 24/04 (2009.01)
H04L 29/08 (2006.01)
G06F 16/29 (2019.01)
(Continued)

(52) U.S. Cl.
CPC .......... *H04L 43/045* (2013.01); *G06F 16/248* (2019.01); *G06F 16/29* (2019.01); *G06F 16/5854* (2019.01); *G06F 16/9537* (2019.01); *H04L 43/16* (2013.01); *H04L 67/18* (2013.01); *H04W 24/04* (2013.01)

(58) Field of Classification Search
CPC .... G06F 16/248; G06F 16/29; G06F 16/5854; G06F 16/9537; H04L 43/045; H04L 43/16; H04L 67/18
See application file for complete search history.

(56) References Cited

U.S. PATENT DOCUMENTS 6,856,942 B2   2/2005 Garnett et al.
7,120,819 B1  10/2006 Gurer et al.
(Continued)

FOREIGN PATENT DOCUMENTS

WO    9315569 A1    8/1993
WO    2014117245 A1    8/2014
WO    2015091784 A1    6/2015

OTHER PUBLICATIONS

"Automated Network Mapping for Network Visualization,", Solarwinds, go.solarwinds.com, accessed: Oct. 2015. http://www.solarwinds.com/solutions/network-visualization.aspx, 4 pp.
(Continued)

Primary Examiner — Dinku W Gebresenbet
(74) Attorney, Agent, or Firm — Guntin & Gust, PLC; Ralph Trementozzi

(57) ABSTRACT

A database is accessed to retrieve performance data associated with a content delivery network. Based on the performance data, a performance metric is determined for components of the content delivery network that are within a particular geographic region. A display is generated that visually represents geographic data representing the particular geographic region, at least one component of the content delivery network within the particular geographic region, and the performance metric.

20 Claims, 6 Drawing Sheets

(51) Int. Cl.
*G06F 16/248* (2019.01)
*G06F 16/583* (2019.01)
*G06F 16/9537* (2019.01)

(56) References Cited

U.S. PATENT DOCUMENTS

| | | | |
|---|---|---|---|
| 8,125,897 | B2 | 2/2012 | Ray et al. |
| 8,274,905 | B2 | 9/2012 | Edwards et al. |
| 8,874,725 | B1 | 10/2014 | Ganjam et al. |
| 9,084,937 | B2 | 7/2015 | Gadher et al. |
| 9,158,811 | B1 | 10/2015 | Choudhary et al. |
| 9,210,600 | B1* | 12/2015 | Jadunandan .......... H04W 24/08 |
| 2002/0177907 | A1* | 11/2002 | Hand .................... G06F 11/323 700/1 |
| 2011/0151829 | A1* | 6/2011 | Velusamy ............... H04L 51/20 455/404.2 |
| 2014/0033055 | A1* | 1/2014 | Gardner ................. H04L 41/22 715/736 |
| 2014/0040464 | A1 | 2/2014 | Singhal et al. |
| 2014/0129708 | A1 | 5/2014 | Goyal et al. |
| 2015/0081847 | A1* | 3/2015 | Hao .................... H04L 65/4076 709/219 |
| 2015/0095960 | A1* | 4/2015 | Hurst ................... H04N 17/004 725/107 |
| 2015/0128056 | A1 | 5/2015 | Rizzi et al. |
| 2015/0149609 | A1* | 5/2015 | Zou ..................... H04L 67/2833 709/224 |
| 2015/0149850 | A1* | 5/2015 | Leach .................... H04L 43/08 714/751 |
| 2015/0341502 | A1* | 11/2015 | Udeshi ................. H04M 15/58 455/405 |

OTHER PUBLICATIONS

"Best-in-Class Network Troubleshooting & Diagnostics", www.whatsupgold.com, downloaded Oct. 10, 2015 http://www.whatsupgold.com/goapplication-performance-monitoring-d1.aspx, 1 pp.

"More Uptime. Less Downtime.", www.pagerduty.com, Sep. 6, 2015 https://www.pagerduty.com/tour/easy-setup/, 9 pp.

* cited by examiner

| Network Check Analysis | | |
|---|---|---|
| Data Load | Data Browser | 15 Minute Data |

Analysis Options

☑ Just the Neighborhoods I Loaded

☑ [48] Hours (Max 48) Limit Data to Last:

☐ [3] Standard Deviations (Def/Max 3) for Bursty FECs Outlier Threshold:

☐ [0] Limits Applicable Query to Results Above This Value Target Stat Threshold:

☐ [5] Hours (Max 24) for Neighborhood Re-initializations Size of Time Bucket:

Analysis Chooser: 15 Minutes

[ Bursty FECs ] [ Neighborhood Reinitializations ] [ Dump All ]

PROCESSING PERFORMANCE DATA OF A CONTENT DELIVERY NETWORK

FIELD OF THE DISCLOSURE

The present disclosure is generally related to processing performance data of a content delivery network.

BACKGROUND

Content delivery networks are configured to deliver multimedia content to user devices, such as residential gateways. To monitor conditions of a content delivery network, various performance data may be measured by devices of the content delivery network. The performance data may be stored in a database or other memory for analysis by a technician or other operator. However, the performance data may be too voluminous to enable the technician to quickly analyze the performance data and identify a relevant performance metric that relates to a service issue. For example, the technician may not be able to view an output of the performance data and quickly identify a location of a service issue within the content delivery network.

In addition, the technician may analyze performance data of a particular device, such as a particular residential gateway, when a service call indicates a service issue for the particular device. However, analysis of the performance data for the particular device may not indicate whether other devices of the content delivery network are experiencing similar or related issues. Thus, a technician may spend time trying to correct a service issue at the particular device without realizing that the service issue is a symptom of another service issue within the content delivery network.

BRIEF DESCRIPTION OF THE DRAWINGS

FIG. 3 is a diagram illustrating a particular implementation of a user interface displayed by a network analysis device;

DETAILED DESCRIPTION

Figure 1:
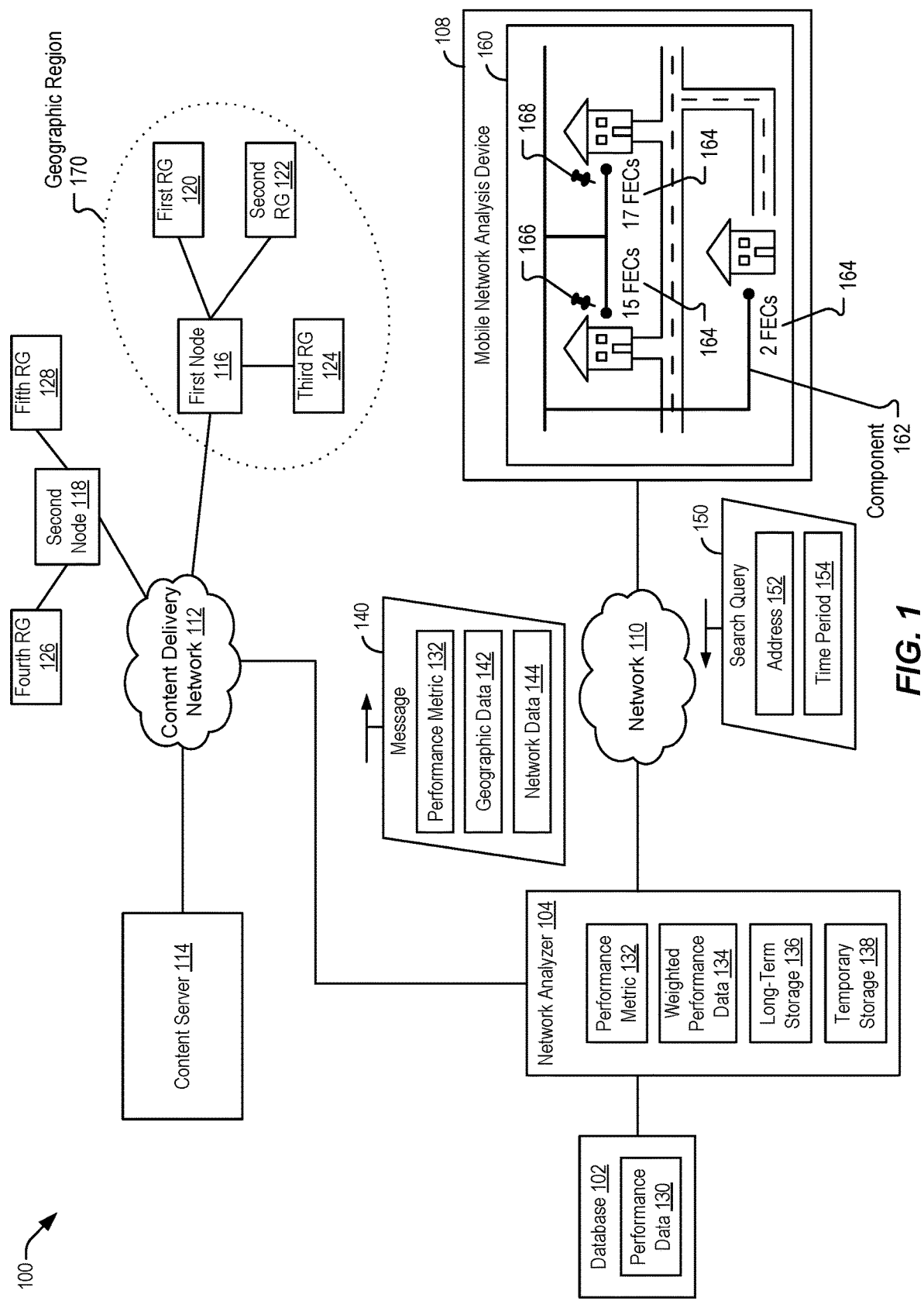
FIG. 1 is a block diagram of a particular implementation of a system for analyzing performance data and generating a display based on a performance metric.

The present disclosure describes systems, apparatuses, and methods of processing performance data of devices of a content delivery network to identify a performance metric associated with devices of the content delivery network that are within a particular geographic region. The performance metric may indicate a service issue with the devices. A location associated with the performance metric may be identified, and a display may be generated that visually represents the performance metric, at least one component of the content delivery network, and geographic data representing the particular geographic region. The display may provide useful information for a technician to address the performance metric (e.g., to address the service issue).

To illustrate, a technician may input a search query into a mobile network analysis device. The search query may include an address (e.g., a customer address) and a time period. The mobile network analysis device may access a database (or a network analyzer that accesses the database) based on the search query and may retrieve performance data measured during the time period and associated with a device at the address, such as a residential gateway. The database may store performance data that is measured periodically (or continually) from the devices of the content delivery network. In addition to the performance data for the device associated with the address, performance data may be retrieved for devices associated with nearby addresses within a geographic region that includes the address. The performance data for the devices may indicate counts of error corrections (e.g., forward error corrections), counts of re-initializations, counts of code violations, counts of error seconds, counts of unavailable seconds, other performance data, or a combination thereof.

Based on the performance data, a performance metric is determined. The performance metric may be determined by analyzing the performance data to identify measurement values that exceed (or fail to exceed) a threshold, measurement values that are statistical outliers compared to the rest of the measurements for the geographic region, or a combination thereof. After determining the performance metric, the mobile network analysis device may generate a display that visually represents geographic data representing the particular geographic region (e.g., the device may display a satellite photo of the particular geographic region), at least one component of the content delivery network within the particular geographic region (e.g., a network cable, a device, etc.), and the performance metric. For example, the display may depict an image of the particular geographic region (e.g., a satellite image, an image of a map, etc.), a graphical illustration of network cables and connections (between cables, devices, or both), and values of the performance metric for each device (or a subset of devices) in the geographic region. In addition, visual icons (e.g., indicators), such as pins, may be depicted at locations of devices that may be experiencing a service issue. To further illustrate, devices having measurement values that exceed (or fail to exceed) a threshold, or measurement values that represent statistical outliers as compared to measurement values of the other devices, may be represented by pins in the display. Different color pins may be used to indicate different types of potential service issues. For example, a first color pin may represent devices having a number of re-initializations that exceeds a re-initialization threshold for the time period, and a second color pin may represent devices having a number of error corrections that are outliers as compared to the other devices of the geographic regions.

Displaying the geographic data, the at least one component, and the performance metric(s) may enable a technician to efficiently react to a service issue without spending a large amount of time analyzing performance data from a database. The database may be configured to store performance data associated with thousands or more devices over multiple months, and manually analyzing this performance data (of the entire database) to identify performance metrics that indicate service issues may be inefficient. The visual display of the geographic data, the at least one component, and the performance metrics may enable a technician to quickly and efficiently identify a potential service issue. Additionally, the technician may be able to enter a particular address for which a service call has been received, and based on the information presented in the display, the technician may identify whether a potential service issue is specific to the particular address or whether other devices in the geographic region may be experiencing the service issue. To illustrate, the technician may identify multiple devices of the content delivery network that are exhibiting similar performance metrics. Based on a display of components, such as network cables, of the content delivery network, the technician may determine additional information related to each of the devices that is experiencing the similar performance metrics. For example, the technician may realize that the devices that are experiencing the similar performance metrics are coupled to a particular network cable. Using this information, the technician may determine that the same service issue is likely effecting the network cable, or an upstream component from the network cable, and not just the device at the particular address. The technician may focus efforts to address the service issue to the network cable (or the upstream component) instead of just to the device at the particular address. Thus, the present disclosure enables a technician to identify correlations in performance metrics (that may indicate a service issue) and network connections within a geographic region that would otherwise be difficult to identify.

In a particular aspect, a method includes accessing a database to retrieve performance data associated with a content delivery network. The method includes determining, based on the performance data, a performance metric for components of the content delivery network that are within a particular geographic region. The method further includes generating a display that visually represents geographic data representing the particular geographic region, at least one component of the content delivery network within the particular geographic region, and the performance metric.

In another particular aspect, an apparatus includes a processor, a display device, and a memory that is accessible to the processor. The memory includes instructions executable by the processor to perform operations. The operations include accessing a database to retrieve performance data associated with a content delivery network. The operations include determining, based on the performance data, a performance metric for components of the content delivery network that are within a particular geographic region. The operations further include generating, at the display device, a display that visually represents geographic data representing the particular geographic region, at least one component of the content delivery network within the particular geographic region, and the performance metric.

In another particular aspect, a computer-readable storage device stores instructions that, when executed by a processor, cause the processor perform operations. The operations include obtaining performance data associated with a content delivery network. The operations include determining, based on the performance data, a performance metric for components of the content delivery network that are within a particular geographic region. The operations further include generating a display that visually represents geographic data representing the particular geographic region, at least one component of the content delivery network within the particular geographic region, and the performance metric.

Referring to FIG. 1, a block diagram of a particular implementation of a system for analyzing performance data and generating a display based on a performance metric is shown and generally designated 100. The system 100 includes a database 102, a network analyzer 104, a mobile network analysis device 108, a content server 114, a first node 116, a second node 118, a first residential gateway (RG) 120, a second RG 122, a third RG 124, a fourth RG 126, and a fifth RG 128. A content delivery network 112 may include the content server 114, the first node 116, the second node 118, the RGs 120-128, and/or other components. The content delivery network 112 may be any network that is operable to provide (e.g., transmit or propagate) media content from at least one component to at least one other component. As non-limiting examples, the content delivery network 112 may include or correspond to a cable network, a broadcast television network, an internet protocol (IP) network, a satellite network, a cellular network, a long-term evolution (LTE) network, or other networks. In FIG. 1, media content may be provided from the content server 114 via the content delivery network 112 to components of the content delivery network 112, such as the first node 116, the second node 118, and the RGs 120-128.

For example, media content may be received from the content delivery network 112 at the first node 116, and the first node 116 may provide the media content to the first RG 120, the second RG 122, the third RG 124, or a combination thereof. As another example, media content may be received from the content delivery network 112 at the second node 118, and the second node 118 may provide the media content to the fourth RG 126, the fifth RG 128, or both. Each of the RGs 120-128 may be configured to provide media content to devices within a corresponding residence. As a non-limiting example, the first RG 120 may be configured to provide media content to media playback devices within a first residence, such as a set-top box device, a cable box, a television, a digital video recorder (DVR), a DVD player, a Blu-ray player, a television, a mobile device (e.g., a wireless telephone, a tablet computer, a laptop computer, a computerized watch, etc.), a desktop computer, or other devices that are configured to receive and to display media content. Although particular components of the content delivery network 112 are illustrated, the content delivery network 112 is not so limited. In other implementations, the content delivery network 112 may include additional components (that are not illustrated in FIG. 1), such as servers, routers, nodes, gateways, switches, head-end components, wired components, wireless components, upstream components, downstream components, other devices, or a combination thereof. Additionally or alternatively, the content delivery network 112 may include fewer or more components than illustrated in FIG. 1.

In the particular implementation of FIG. 1, components of the content delivery network 112 may be located within different geographic locations. To illustrate, the first node 116, the first RG 120, the second RG 122, and the third RG 124 may be located within a geographic region 170. The geographic region 170 may represent a neighborhood, a town, a city, a county, a state, a multi-state area, or a different size region. In a particular implementation, the geographic region 170 corresponds to a neighborhood. Additionally or alternatively, the geographic region 170 may be defined based on a configuration of the content delivery network 112. For example, the geographic region 170 may represent a region containing components that are connected to a particular portion or element (e.g., a particular network cable or wire, a particular device, etc.) of the content delivery network 112. In the implementation illustrated in FIG. 1, the second node 118, the fourth RG 126, and the fifth RG 128 may be located within a different geographic region than the geographic region 170.

The components (e.g., devices) of the content delivery network 112 may be configured to generate various performance measurements on a periodic or continuous basis. The performance measurements for the components may be referred to as performance data 130. The performance data 130 may include measurements indicative of performance of the components of the content delivery network 112, such as the RGs 120-128, the nodes 116 and 118, or other components or devices. For example, the performance data 130 may indicate a count of error corrections, such as forward error corrections (FECs), a count of re-initializations, a count of code violations, a count of error seconds, a count of unavailable seconds, other measurements, or a combination thereof, associated with the components of the content delivery network 112. In a particular implementation, the performance data 130 includes measurements associated with hundreds, thousands, or millions of components, and the performance data 130 may be too voluminous to be analyzed manually by a technician. As used herein, performing an FEC refers to a component of the content delivery network 112 determining that an error has occurred with receipt of a packet of media content, and, in response to the error, retrieving at least one copy of the packet from a media stream to perform an error correction operation. As used herein, re-initializations refer to a component of the content delivery network 112 performing a re-initialization operation (e.g., a reboot operation).

The components of the content delivery network 112 may be configured to provide the performance data 130 via the content delivery network 112 to the network analyzer 104. In a particular implementation, the network analyzer 104 stores the performance data 130 in the database 102. Alternatively, another component may store the performance data 130 in the database 102, or the performance data 130 may be provided directly to the database 102. The database 102 may be accessible to the network analyzer 104 and may be configured to store the performance data 130 and to provide the performance data 130, or a portion thereof, based on a search query, as further described herein. In a particular implementation, because the components of the content delivery network 112 are periodically (or continuously) providing new performance measurements, the database 102 may be periodically erased or overwritten with new performance data. In another particular implementation, the performance data 130 in the database 102 may be overwritten as new performance measurements are received (e.g., in a first-in, first-out (FIFO) manner). Thus, the database 102 may be configured to temporarily store the performance data 130. Although the performance data 130 is described herein as being stored (at least temporarily) in the database 102, in an alternate implementation, the performance data 130 may be processed by the network analyzer 104 as the performance data 130 is received, and the processed performance data may be used as described further herein.

The network analyzer 104 may be configured to process the performance data 130 and to communicate via a network 110 with the mobile network analysis device 108 to initiate generation of a display based on the performance data 130, as further described herein. The network analyzer 104 may include a processor (or multiple processors) and a memory that is accessible to the processor and that stores instructions that are executable by the processor to perform the various operations described herein. The network analyzer 104 may also include other components, such as an interface, a transmitter, a receiver, a transceiver, or a combination thereof, that enables the network analyzer 104 to send and receive data via the content delivery network 112 and the network 110.

The mobile network analysis device 108 may be carried by a technician and may be configured to provide information related to the content delivery network 112. The mobile network analysis device 108 may be a mobile device, such as a mobile computing device, a mobile telephone, a tablet computer, a laptop computer, or another computerized device that is able to communicate wirelessly with the network analyzer 104 via the network 110. Additionally or alternatively, the mobile network analysis device 108 may be a computer, such as a desktop computer. In other implementations, the mobile network analysis device 108 may be mounted within a vehicle or integrated within a component of a vehicle, such as a control unit or a navigation system. In other implementations, the system 100 may include a device, such as a computer, a vehicle-mounted device, or a device integrated within a component of a vehicle, that is configured to perform the operations of the mobile network analysis device 108. The mobile network analysis device 108 may include a processor (or multiple processors) and a memory that is accessible to the processor and that stores instructions that are executable by the processor to perform the various operations described herein. The mobile network analysis device 108 may also include other components, such as an interface, a transmitter, a receiver, a transceiver, or a combination thereof, that enables the network analyzer 104 to send and receive data via the network 110.

The network analyzer 104 and the mobile network analysis device 108 may be configured to receive input information from the technician and to display information related to the content delivery network 112 based on the input information. To illustrate, the technician may be aware that a service call (or other indicator of a service issue) has been received for a particular address. The technician may use the mobile network analysis device 108 to determine performance metrics associated with a component located at the particular address, as well as performance metrics for nearby components. The mobile network analysis device 108 may be configured to receive a user input from the technician indicating an address 152 and a time period 154. For example, the mobile network analysis device 108 may include a keypad, a touch screen, or another user input device, and the technician may input a user input that includes the address 152 and the time period 154. The address 152 and the time period 154 may be selected and adjusted via a user interface, as further described with reference to FIG. 3.

The mobile network analysis device 108 may generate a search query 150 that indicates the address 152 and the time period 154, and the mobile network analysis device 108 may transmit the search query 150 to the network analyzer 104 via the network 110. In some implementations, the user input may include additional information or alternative information, such as a particular performance metric, a particular geographic region to analyze, an analysis parameter, other information, or a combination thereof, and the additional information or alternative information may also be indicated by the search query 150. In a particular implementation, the search query 150 indicates a particular event (e.g., a service call, a re-initialization, a particular metric exceeding (or failing to satisfy) a threshold, a particular metric being a statistical outlier, etc.), a particular location (e.g., an address of a customer), a particular component of the content delivery network 112 (e.g., a RG of a customer, a network node, a particular connection between a network cable and a device, etc.), a particular grouping of components of the content delivery network 112 (e.g., a neighborhood, a grouping based on a network configuration, a city, a region, etc.), a component type (e.g., nodes, residential gateways, head-ends, etc.), a time period (e.g., the time period 154), or a combination thereof.

The network analyzer 104 may be configured to receive the search query 150 and to access the database 102 based on the search query 150. For example, the network analyzer 104 may retrieve a portion of the performance data 130 based on the search query 150. To illustrate, the network analyzer 104 may access the database 102 using a Structured Query Language (SQL) query or another type of database query. The network analyzer 104 may retrieve a portion of the performance data 130 based on the search query 150. For example, the network analyzer 104 may retrieve a portion of the performance data 130 that includes data for a component (or components) associated with the address 152. The retrieved performance data may also be associated with the time period 154 (e.g., the network analyzer 104 may retrieve performance measurements that have been generated during the time period 154).

Additionally, the network analyzer 104 may determine additional addresses within a geographic region based on a distance to the address or a logical grouping of components of the content delivery network 112. For example, the network analyzer 104 may determine additional addresses within a particular proximity (e.g., distance) of the address 152. As another example, the network analyzer 104 may determine additional addresses on the same street as the address 152, in the same residential area as the address 152, in the same town or city as the address 152, in the same county as the address 152, in the same state as the address 152, or based on some other geographic or political region that includes the address 152. As another example, the network analyzer may determine additional addresses that are associated with a common logical grouping of components of the content delivery network 112. A logical grouping of components may refer to a plurality of components that are connected to a common component of the content delivery network 112, such as a network cable (or a portion of a network cable), a node, another upstream component, or some other component, or to a grouping of components that are commonly identified in data that represents the content delivery network 112. The portion of the performance data 130 retrieved by the network analyzer 104 may include data associated with the additional addresses within the geographic region. For example, the network analyzer 104 may determine components that are located nearby (e.g., within a short distance) to the address 152, and the network analyzer 104 may retrieve a portion of the performance data 130 that is associated with the nearby components in addition to the portion of the performance data 130 that is associated with the component located at the address 152.

If the search query 150 includes additional parameters, the performance data 130 may be filtered based on the additional parameters. For example, if the search query 150 indicates a particular measurement, the network analyzer 104 may filter the retrieved portion of the performance data 130 by discarding data that is not associated with the particular measurement. As another example, if the search query 150 indicates a particular neighborhood (or other geographic region), the portion of the performance data 130 that is retrieved includes data for components located within the neighborhood. Additional details regarding the search query 150 and retrieving the performance data 130 are described with reference to FIG. 3.

The network analyzer 104 may determine, based on the retrieved portion of the performance data 130, a performance metric 132 (or performance metrics) for components of the content delivery network 112 that are within a particular geographic region that includes the address 152. The performance metric 132 may include a measurement or measurements, such as one or more of the measurements represented by the performance data 130. Additionally or alternatively, the retrieved portion of the performance data 130 may be processed to generate additional metrics, and the performance metric 132 may include the additional metrics. The one or more measurements may be indicative of a service issue within the particular geographic region.

The network analyzer 104 may identify a service issue within the particular geographic region based on a statistical analysis of portions of the performance data 130. To illustrate, the network analyzer 104 may be configured to perform a statistical analysis on the retrieved portion of the performance data 130 to determine the performance metric 132. For example, the network analyzer 104 may analyze the retrieved portion of the performance data 130 to determine whether a measurement for the component associated with the address 152 indicates that the component may be experiencing a service issue, and the network analyzer 104 may use the measurement as the performance metric 132. As a particular example, the performance metric 132 may be one of the measurements within the portion of the performance data 130 that has a particular value, such as a value that exceeds (or fails to exceed) a threshold, a value that is a statistical outlier as compared to values associated with other components located within the particular geographic region, or another value indicative of a service issue.

The network analyzer 104 may also generate weighted performance data 134 by weighting the data associated with the additional addresses (e.g., addresses that are located within a threshold distance of the address 152, as one example) based on a proximity of the additional addresses to the address 152. For example, a first subset of components may be located on the same street as the address 152, a second subset of components may be located on other streets, and the network analyzer 104 may weight first data associated with the first subset higher than second data associated with the second subset based on the proximity of the first subset to the address 152. Data for other components may be weighted based on a distance between the address 152 and the corresponding locations of the other components. As another example, a third subset of components may be connected to the same portion of a network cable (or wire) as the component associated with the address 152, a fourth subset of components may be connected to other portions of the network cable, and the network analyzer 104 may weight third data associated with the third subset higher than fourth data associated with the fourth subset.

The network analyzer 104 may analyze the weighted performance data 134 to generate the performance metric 132. As one example, the network analyzer 104 may identify that an average count of re-initializations for components of the particular geographic region (e.g., a geographic region that includes the address 152) during the time period 154 is potentially indicative of a service issue, and the network analyzer 104 may weight re-initialization counts for components that are nearby to the particular component higher than re-initialization counts for components that are farther away from the particular component. If the average count of re-initializations, which is determined based on the weighted values, exceeds a particular value, the network analyzer 104 may identify the average count of re-initializations as indicative of a service issue, and the performance metric 132 may include the average count of re-initializations. In other implementations, other measurements may be weighted and processed to generate the performance metric 132.

Performing the statistical analysis on the retrieved portion of the performance data 130 (or the weighted performance data 134) may include performing a "threshold analysis." To illustrate, the network analyzer 104 may store thresholds corresponding to measurements included within the performance data 130. The network analyzer 104 may analyze the retrieved portion of the performance data 130 (or the weighted performance data 134) to determine whether any of the measurements satisfy a corresponding threshold. In a particular implementation, the network analyzer 104 determines whether any of the measurements exceeds a corresponding threshold, and the performance metric 132 may indicate the measurements that exceed the corresponding threshold. To illustrate, a threshold associated with re-initializations may be ten during a particular time frame, and the network analyzer 104 may identify any components within the particular geographic region that have performed more than ten re-initializations during the particular time frame. In an alternate implementation, the network analyzer 104 determines whether any of the measurements fails to exceed a corresponding threshold. In this implementation, the performance metric 132 may indicate (e.g., represent) the measurements that fail to exceed the corresponding threshold. In some implementations, the thresholds may be related to a duration of the time period 154. As an example, if the time period 154 is an hour, the threshold associated with re-initializations may be two, and if the time period 154 is a day, the threshold associated with re-initializations may be ten. In other examples, the thresholds may have other values depending on the duration of the time period 154.

Performing the statistical analysis on the retrieved portion of the performance data 130 may also include performing an "outlier analysis." To illustrate, the network analyzer 104 may analyze the retrieved portion of the performance data 130 to identify measurements having values that are statistical outliers as compared to other values within the retrieved portion of the performance data 130. In a particular example, the retrieved portion of the performance data 130 may indicate that a count of error corrections for most of the components within the particular geographic region is within a range from one to five error corrections. In this example, at least one component may have a count of error corrections that is within a range of fifteen to twenty-five error corrections, which represents a statistical outlier as compared to the values associated with the other components within the particular geographic region. Because the network analyzer 104 determines that a count of error corrections represents at least one statistical outlier, the performance metric 132 may include the count of error corrections for the components of the particular geographic region.

In a particular implementation, determining the performance metric 132 may include analyzing the retrieved portion of the performance data 130 (or the weighted performance data 134) to identify time-correlated events. The performance metric 132 may indicate a number of occurrences of an event at a subset of components, times at which the event occurred, or a combination thereof. The event may include a service call, a customer request, a performance measurement that satisfies a threshold, a performance measurement that is a statistical outlier as compared to performance measurements of other components within a particular geographic region, or a combination thereof. The network analyzer 104 may be configured to identify measurements that are time-correlated.

For example, the network analyzer 104 may identify a first component within the particular geographic region that experiences a particular event based on the retrieved portion of the performance data 130. The event may be related to a performance measurement, such as a re-initialization by a component, or the event may be more significant, such as a service call that is associated with the component. The number of occurrences of the event may be determined by the network analyzer 104 for a specified time period, such as the time period 154. The network analyzer 104 may identify a similar event that occurs at a nearby component within a short time frame. For example, the network analyzer 104 may identify a re-initialization that is performed at another component two seconds later, as a non-limiting example. The network analyzer 104 may determine that the two events are related, and the performance metric 132 may indicate the time-correlated events (e.g., the re-initializations that occur at nearby components in a short time frame). In some implementations, the performance metric 132 may include information indicating a temporal relationship between the events (e.g., a duration of time between when the events occurred, which event occurred first, etc.). As another example, the network analyzer 104 may be configured to identify simultaneous (or nearly simultaneous) occurrence of a particular type of event at multiple devices. To illustrate, the network analyzer 104 may identify three RGs within the particular geographic region that concurrently perform re-initializations, or that perform re-initializations within a short time frame.

The network analyzer 104 may also be configured to process the retrieved portion of the performance data 130 (or the weighted performance data 134) to identify a performance trend associated with the retrieved portion of the performance data 130. For example, the network analyzer 104 may determine whether an event is occurring with a relatively stable (e.g., constant) frequency during the time period 154, or whether a frequency of occurrence of the event is changing (e.g., increasing or decreasing). If the network analyzer 104 identifies a performance trend (e.g., a statistically significant change in a frequency of occurrence of an event), the performance metric 132 may include the measurement subject to the performance trend. For example, if the number of error corrections performed at a particular component is increasing during the time period 154, the performance metric 132 may indicate a rate of change of the number of error corrections. Identifying performance trends may indicate when a service issue originated. For example, if a particular component begins performing error corrections with an increasing frequency at a particular time, the network analyzer 104 may determine that a service issue is being experienced at the particular component at the particular time.

Additionally, the network analyzer 104 may be configured to determine whether processing of the retrieved portion of the performance data 130 (or the weighted performance data 134) indicates that a service issue is being experienced by the components that are located within the particular geographic region. Based on the determination, the network analyzer 104 may determine where (or whether) to store the retrieved portion of the performance data 130 (or the weighted performance data 134). To illustrate, the network analyzer 104 may store the retrieved portion of the performance data 130 (or the weighted performance data 134) in long-term storage 136 when the processing of the performance data 130 indicates that a service issue is being experienced by the components that are located within the particular geographic region. The long-term storage 136 may be a memory location that is designated to store data without being periodically erased or overwritten. Additionally or alternatively, the long-term storage 136 may be configured to store data for a long period of time. As one example, the long-term storage 136 may include a non-volatile memory. In a particular implementation illustrated in FIG. 1, the long-term storage 136 is within the network analyzer 104 (e.g., within a memory of the network analyzer 104). Alternatively, the long-term storage 136 may be a memory location that is external to and accessible to the network analyzer 104.

The network analyzer 104 may store the retrieved portion of the performance data 130 (or the weighted performance data 134) in temporary storage 138 when the processing of the performance data 130 fails to indicate that a service issue is being experienced by the components that are located within the particular geographic region. The temporary storage 138 may be a memory location that is designated to temporarily store data until the data is periodically overwritten. In a particular implementation illustrated in FIG. 1, the temporary storage 138 is within the network analyzer 104 (e.g., within a memory of the network analyzer 104). Alternatively, the temporary storage 138 may be a memory location that is external to the network analyzer 104. In a particular implementation, the temporary storage 138 may be included in (or part of) the database 102, and the database 102 may be periodically overwritten with updated performance data from the components of the content delivery network 112. In an alternate implementation, the network analyzer 104 may discard the retrieved portion of the performance data 130 when the processing of the performance data 130 fails to indicate that a service issue is being experienced by the components that are located within the particular geographic region.

In a particular implementation, the network analyzer 104 may be configured to receive the performance data 130 from the components of the content delivery network 112 and to process the performance data 130 as it is received instead of accessing the database 102 to retrieve the performance data 130. In this implementation, the network analyzer 104 may process the performance data 130 to identify that performance metric 132 without receiving the search query 150. Instead, the network analyzer 104 may be configured to process the performance data 130 on a region-by-region basis, such as a neighborhood-by-neighborhood basis, to identify the performance metric 132 that is indicative of a service issue. If the network analyzer 104 identifies a service issue, the network analyzer 104 may generate and transmit the message 140 to the mobile network analysis device 108 for use in initiating the display 160. Processing the performance data 130 on a region-by-region basis may be more time and resource intensive than retrieving a portion of the performance data 130 based on the search query 150. However, processing the performance data 130 on a region-by-region basis may enable the network analyzer 104 to identify service issues that would otherwise be missed (e.g., if a technician does not enter an address within a particular geographic region to trigger processing of the performance data for the particular geographic region).

After generating the performance metric 132, the network analyzer 104 may generate a message 140 that includes the performance metric 132, geographic data 142, and network data 144. The network analyzer 104 may transmit the message 140 to the mobile network analysis device 108 via the network 110. The network 110 may include a wired network, a wireless network, a packet-switched network, a cable network, a cellular telephone network, a satellite network, a client-server network, a peer-to-peer or ad hoc network, another type of network or a combination thereof.

The geographic data 142 represents the particular geographic region. For example, the geographic data 142 may include image data of a satellite photo of the particular geographic region, image data of a street map of the particular geographic region, other image data, or a combination thereof. The geographic data 142 may also include other data, such as addresses of locations and global positioning satellite (GPS) coordinates of locations, as non-limiting examples.

The network data 144 indicates information about components of the content delivery network 112 within the particular geographic region. The network data 144 may indicate locations of network cables (or wires) of the content delivery network 112 within the particular geographic region, locations of other components (e.g., RGs, nodes, hubs, wireless transmitters, taps, etc.), interconnections between the components of the content delivery network 112, or a combination thereof. For example, the network data 144 may indicate locations of network cables within the particular region, taps or other interconnections between customer components (e.g., RGs, routers, etc.) and the network cables, network nodes, interconnections between the network nodes and the network cables, other components, and interconnections between the other components and the network cables. In a particular implementation, the network data 144 indicates whether the network cables and buried or above-ground. Information about the network cable type (e.g., buried or above-ground) may be used in generating a display, as further described herein.

The geographic data 142 and the network data 144 may be stored at, or may be accessible to, the network analyzer 104, and the network analyzer 104 may be configured to select the geographic data 142 and the network data 144 that are related to the particular geographic region based on the search query 150. For example, the network analyzer 104 may determine the particular geographic region that includes the address 152, and the network analyzer 104 may retrieve the geographic data 142 and the network data 144 that are associated with the particular geographic region. After retrieving the geographic data 142 and the network data 144, the network analyzer 104 may include the geographic data 142 and the network data 144 in the message 140 with the performance metric 132.

The mobile network analysis device 108 may be configured to receive the message 140 from the network analyzer 104 and to generate a display 160 based on the message 140. The mobile network analysis device 108 may include a display device (e.g., a screen, a touch screen, or another display device that is integrated within or coupled to the mobile network analysis device 108) that is configured to display information, including information based on the message 140. The mobile network analysis device 108 may be configured to generate the display 160 based on the message 140 and initiate the display 160 at the display device.

To illustrate, the mobile network analysis device 108 may generate the display 160 that visually represents the geographic data 142, at least one component 162 of the content delivery network 112 (based on the network data 144), and the performance metric 132. The display 160 may visually represent the geographic data 142 by displaying an image or rendering of the particular geographic region. For example, the display 160 may depict a visual representation of buildings, streets, landmarks, terrain, other visual representations of geographic data, or a combination thereof. In a particular implementation, the visual representation of the geographic data 142 may be an image of the particular region or a satellite image (e.g., photo) of the particular region. Additionally or alternatively, the display 160 may depict information, such as addresses, GPS coordinates, street names, street addresses, zip codes, city names, county names, state names, other geographic information, or a combination thereof, based on the geographic data 142.

The display 160 may visually represent the network data 144 by displaying a visual representation of the at least one component 162 of the content delivery network 112 within the particular geographic region. The at least one component 162 may include a network cable a residential gateway, a node, a hub, a wireless transmitter, a tap, an interconnection between components (or between components and network cables), another component, or a combination thereof. For example, as illustrated in FIG. 1, the display 160 may depict a visual representation of various network cables of the content delivery network 112 that are located within the particular geographic region. In some implementations, the display 160 may indicate a type of network cable. For example, above-ground network cables may be represented differently than buried network cables, as further described with reference to FIG. 2. Additionally or alternatively, the display 160 may depict information, such as network cable or component names, labels, GPS coordinates, other information, or a combination thereof.

The display 160 may visually represent the performance metric 132 by displaying values 164 of the performance metric 132 for the components of the content delivery network 112 (or for a subset of the components) that are located within the particular geographic region. For example, a value 164 of a performance measurement (or values of multiple performance measurements) may be displayed adjacent to the locations of the components of the content delivery network 112 in the display 160. In a particular implementation, the performance metric 132 indicates a number of occurrences of an event (e.g., forward error corrections (FECs) in the example illustrated in FIG. 1) at a subset of the components, and the number of occurrences (e.g., the values 164) for each component of the subset is overlaid on the geographic data 142 at a location of the corresponding component. Additionally, in some implementations, the performance metric 132 may be visually represented by an icon (e.g., an indicator) that is overlaid on the geographic data 142 at locations corresponding to a set of components associated with time-correlated events. In the example illustrated in FIG. 1, the values 164 corresponding to two components (e.g., fifteen FECs and seventeen FECs) may exceed a threshold (e.g., ten FECs) during the time period 154, and thus the performance metric 132 indicates a time-correlated event for the two components. In this example, a first icon 166 and a second icon 168 may be overlaid at locations of the two components, and no icon may be overlaid at a third component (e.g., a component having the value 164 of two FECs, which fails to exceed the threshold).

In a particular implementation, the display 160 visually represents a combination of the geographic data 142, the at least one component 162, and the performance metric 132. For example, the visual representation of the at least one component 162 may be an icon representing a particular component, such as a component associated with the address 152, and the performance metric 132 may be displayed near the visual representation of the at least one component 162. Other performance metrics corresponding to other components may be displayed near identifiers of the other components. Additionally, geographic information, such as a city name, a county name, a neighborhood name, addresses, GPS coordinates, or other information based on the geographic data 142 may be displayed. Alternatively, an image or a map based on the geographic data 142 may be displayed. The various information (e.g., the geographic information, the visual representation of the at least one component 162, and the performance metric 132) may be displayed in separate portions of the display 160. Alternatively, one or more of the visual representations of the geographic data 142, the at least one component 162, and the performance metric 132 may be combined in a single portion of the display 160.

In another particular implementation, the visual representations of the at least one component 162 and the performance metric 132 may be overlaid on the visual representation of the geographic data 142. As illustrated in FIG. 1, the visual representation of the at least one component 162 (e.g., the network cables) and the values 164 of the performance metric 132 are overlaid on the visual representation of the geographic data 142 (e.g., overlaid on the map illustrated in FIG. 1). By providing information related to a configuration of the content delivery network 112 (e.g., a visual representation of the network data 144) and the performance metric 132 overlaid on a visual representation of the geographic data 142, the display 160 may enable a technician to quickly understand and to determine how to address a service issue for components within the particular geographic region.

In a particular implementation, the network analyzer 104 or another computing device may be configured to perform some or all of the operations of the mobile network analysis device 108. For example, the network analyzer 104 may include a user input device that is configured to receive user inputs to generate a search query to the database 102. Additionally, the network analyzer 104 may include (or be coupled to) a display device that is configured to generate the display 160, as described above. Thus, in some implementations, any of the operations described with reference to the mobile network analysis device 108 may also or in the alternative be performed by the network analyzer 104. In these implementations, generation and transmission of the message 140 may be omitted. In another particular implementation, the mobile network analysis device 108 may be configured to perform the operations of the network analyzer 104. In this implementation, the mobile network analysis device 108 is configured to access the database 102 and to process the retrieved portion of the performance data 130 to generate the performance metric 132, and the network analyzer 104 may be omitted from the system 100.

During operation, a technician may generate a search query. For example, the technician may enter the address 152 and the time period 154 into the mobile network analysis device 108 via the user input device. The address 152 may correspond to an address of the first RG 120, and the technician may wish to see if a service issue that is being experienced by the first RG 120 is being experienced by other components within the geographic region 170 (e.g., a neighborhood that includes the address 152). The mobile network analysis device 108 may generate the search query 150 that indicates the address 152 and the time period 154, and the mobile network analysis device 108 may transmit the search query 150 to the network analyzer 104 via the network 110.

The network analyzer 104 may receive the search query 150 and may access the database 102 based on the search query 150 to retrieve a portion of the performance data 130. For example, the network analyzer 104 may retrieve a portion of the performance data 130 that corresponds to the first RG 120 and to other components (e.g., the second RG 122, the third RG 124, and the first node 116) that are located within the geographic region 170. The retrieved portion of the performance data 130 may include measurements generated during the time period 154. In a particular implementation, the search query 150 may include additional parameters (as further described with reference to FIG. 3), and the portion of the performance data 130 may be retrieved and filtered based on the additional parameters.

The network analyzer 104 may process the received portion of the performance data 130 to determine the performance metric 132. In a particular implementation, the network analyzer 104 may generate the weighted performance data 134 by weighting the retrieved portion of the performance data 130 based on proximity of the corresponding components to the address 152, and the weighted performance data 134 may be processed to generate the performance metric 132. The performance metric 132 may include measurements that exceed (or fail to exceed) a threshold, measurements representing statistical outliers, or a combination thereof. Additionally or alternatively, the performance metric 132 may indicate time-correlated events or a performance trend. The network analyzer 104 may store the retrieved portion of the performance data 130 (or the weighted performance data 134) in the long-term storage 136 if the processing of the retrieved portion of the performance data 130 indicates that a service issue is being experienced by components within the geographic region 170, and the network analyzer 104 may store the retrieved portion of the performance data 130 (or the weighted performance data 134) in the temporary storage 138 if the processing of the retrieved portion of the performance data 130 fails to indicate that a service issue is being experienced by components within the geographic region 170. In an alternate implementation, instead of storing the retrieved portion of the performance data 130 in the temporary storage 138, the retrieved portion of the performance data 130 may be discarded.

After determining the performance metric 132, the network analyzer 104 may generate the message 140 that includes the performance metric 132, the geographic data 142, and the network data 144. The geographic data 142 and the network data 144 may correspond to the geographic region 170. The network analyzer 104 may transmit the message 140 to the mobile network analysis device 108 via the network 110. In an alternate implementation, the network analyzer 104 may indicate locations of the performance metric 132, the geographic data 142, and the network data 144 in the message 140. In response to receiving the message 140, the mobile network analysis device 108 may retrieve the performance metric 132, the geographic data 142, and the network data 144 for use in generating the display 160. As a particular example, the mobile network analysis device 108 may retrieve the performance metric 132 from the database 102 (or from long-term storage 136), and the mobile network analysis device 108 may retrieve the geographic data 142 and the network data 144 from other data sources that are external to the mobile network analysis device 108.

The mobile network analysis device 108 may generate the display 160 that visually represents the performance metric 132, the geographic data 142, and the network data 144. In a particular implementation, the display 160 may visually represent a combination of the geographic data 142, the at least one component 162, and the performance metric 132. Alternatively, the performance metric 132 and the at least one component 162 may be overlaid on the visual representation of the geographic data 142. For example, the display 160 may visually represent a map of the geographic region 170, and the at least one component 162 (and other information based on the network data 144) and the values 164 (based on the performance metric 132) may be overlaid on the map. In the example illustrated in FIG. 1, locations corresponding to the first RG 120, the second RG 122, and the third RG 124 are represented in the display 160.

Thus, the system 100 enables analysis of the performance data 130 to determine the performance metric 132 associated with devices (e.g., components) of the content delivery network 112 within the geographic region 170. Because the performance data 130 may be weighted and analyzed to determine measurements that exceed (or fail to exceed) thresholds or that are statistical outliers, the performance metric 132 may be indicative of a service issue that likely effects multiple components of the content delivery network 112 within the geographic region 170. The mobile network analysis device 108 may generate the display 160 that visually represents the geographic data 142, the network data 144, and the performance metric 132. By depicting such information in an easy-to-use visual format, the mobile network analysis device 108 may enable a technician to quickly and easily determine whether a service issue that is effecting the particular component (e.g., the first RG 120) located at the address 152 is also likely effecting other components within the geographic region 170. Using this information, the technician may be able to quickly determine a plan to address the service issue without performing time consuming data analysis of the performance data 130 or performing testing at the address 152.

Figure 2:
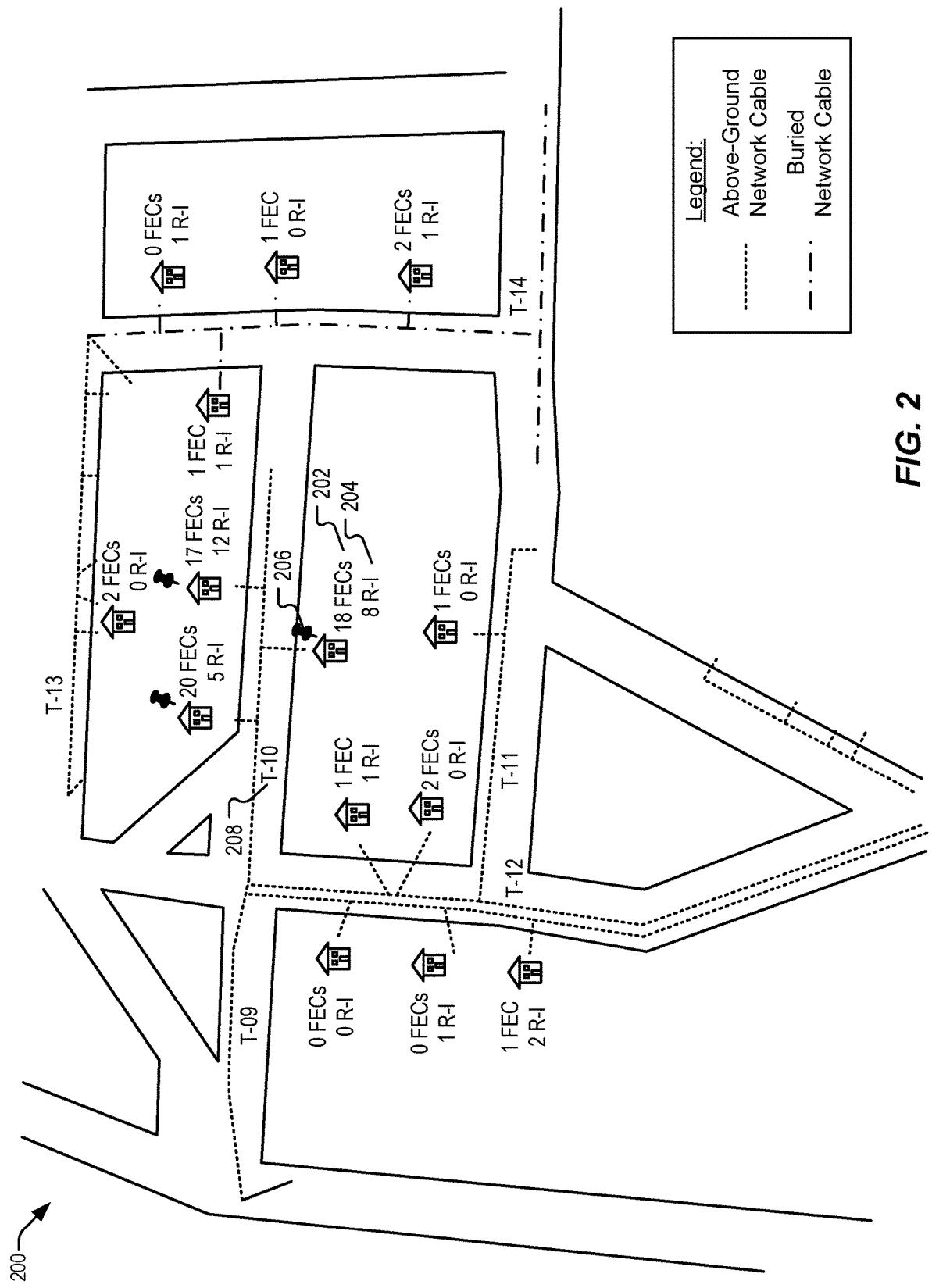
FIG. 2 is a diagram illustrating a particular example of a display that visually represents at least one component of a content delivery network, a performance metric, and geographic data.

Referring to FIG. 2, a diagram illustrating a particular example of a display that visually represents at least one component of a content delivery network, a performance metric, and geographic data is shown and generally designated 200. In a particular implementation, the display 200 may correspond to the display 160 that is initiated at the mobile network analysis device 108 and that visually represents the performance metric 132, the geographic data 142, and the at least one component 162 of FIG. 1.

In the implementation illustrated in FIG. 2, the performance metrics and the visual representation of at least one component of the content delivery network 112 are overlaid on the geographic data 142. To illustrate, the display 200 includes a visual representation of a map of a neighborhood (e.g., a particular geographic region). The visual representation includes houses, land plots, streets, intersections, and other geographic information. Additionally, the display 200 may include textual information, such as addresses or GPS coordinates (not shown in FIG. 2). Each of the locations (e.g., the houses) in FIG. 2 may be associated with a component of the content delivery network 112, such as a RG, a router, a cable modem, or another component.

The performance metrics and the visual representation of the network data 144 may be overlaid on the visual representation of the geographic data 142. For example, a first set of lines and a second set of lines in FIG. 2 represent network cables of the content delivery network 112, and the sets of lines may be displayed on an image of the neighborhood (e.g., the visual representation of the geographic data 142). In the example illustrated in FIG. 2, a first line type indicates above-ground network cables, and a second line type indicates buried (e.g., underground) network cables. In other implementations, the different types of network cables may be indicated in other ways, such as by using different colors, different formats or styles, different icons, different labels, or some other way of indicating differences between the types of network cables. The network cables may also be labeled. For example, the display 200 depicts an illustrative label 208 ("T-10") of a particular network cable. In FIG. 2, the network cables are labeled T-9 through T-14. The labels may indicate different portions of network cables, and may assist a technician in determining which network cable (or other component) a particular component is connected to.

The performance metrics (or a subset of the performance metrics) may also be overlaid on the visual representation of the geographic data 142. For example, an illustrative first performance metric 202 and an illustrative second performance metric 204 may be displayed on the image (e.g., the visual representation of the geographic data 142) at a location corresponding to a particular component. Each of the other components may have a corresponding first performance metric and a corresponding second performance metric, as illustrated in FIG. 2. In other implementations, only a subset of the components within the particular neighborhood (e.g., the particular geographic region) may have the performance metrics displayed. For example, performance metrics may not be displayed if the performance metrics are not indicative of a service issue (e.g., performance metrics that fail to exceed a threshold or that are not statistical outliers may not be displayed). In FIG. 2, two performance metrics are illustrated for convenience. In other implementations, more than two or fewer than two performance metrics may be illustrated. In a particular implementation, the performance metrics may be interspersed with other information, such as addresses, customer identifiers, network component identifiers, and other information related to the location of the component, the customer, the configuration of the network, or a combination thereof.

The performance metrics may indicate a number of occurrences of an event. For example, in FIG. 2, the first performance metric 202 is a count of forward error corrections (FECs), and the second performance metric 204 is a count of re-initializations (R-I). In other examples, the performance metrics may indicate a number of occurrences of other events, such as code violations, error seconds, unavailable seconds, service calls, or other events. In addition to the performance metrics, the display 200 may also depict icons at locations that may be experiencing a service issue. For example, the display 200 depicts an illustrative icon 206 at a location that may be experiencing a service issue. In a particular implementation, the icon 206 may be a pin or a pushpin. In other implementations, the icon 206 may be a different type of indicator. In some implementations, a color of the icon 206 may be based on which performance metric is used in the determination that the component at that location is experiencing a service issue. For example, the icon 206 may have a first color if the first performance metric 202 indicates that the corresponding component is experiencing a service issue, and the icon 206 may have a second color if the second performance metric 204 indicates that the corresponding component is experiencing a service issue.

In the example illustrated in FIG. 2, the components that are experiencing a service issue may be identified based on whether the count of FECs exceeds a threshold (e.g., fifteen FECs) or whether the count of re-initializations is a statistical outlier. To illustrate, a subset of components in the particular geographic region (e.g., components at the locations associated with the three pushpin icons in FIG. 2) may each have a count of FECs that exceeds the threshold of fifteen FECs. For example, the subset of components may have FECs of eighteen, twenty, and seventeen, which each exceed the threshold of fifteen FECs. The threshold may be set automatically (e.g., by the network analyzer 104 or the mobile network analysis device 108), set by a technician, or set based on a default (e.g., preprogrammed) value. Additionally, the subset of components may each have a count of re-initializations that are statistical outliers as compared to other components in FIG. 2. For example, the subset of components may have eight, five, and twelve re-initializations, which are statistical outliers as compared to the other components, which each have zero, one, or two re-initializations. In some implementations, the outliers may be determined based on comparisons to measurements associated with other components in the particular geographic region. Because the other components in the particular geographic region may be similarly situated to the component at a particular address, determining an outlier based on the measurements associated with the other components in the geographic region may quickly indicate a service issue that is effecting a subset of components in the geographic region. In other implementations, the outliers may be determined based on comparisons to measurements associated with other components in a larger area. For example, an outlier may be determined when based on a standard deviation determined for all components of the content delivery network 112 (e.g., a nationwide network). Based on the counts of FECs exceeding the threshold, the counts of re-initializations being statistical outliers, or both, the display 200 may depict the icon at locations of the subsets of components.

A technician may view the display 200 and may identify components that are likely experiencing the same service issue. To illustrate, if the technician entered an address that corresponds to the location in FIG. 2 with the illustrative icon 206, the technician is presented with enough visual information to quickly realize that two other components of the content delivery network 112 are experiencing the same performance metrics, and likely experiencing the same service issue. Additionally, the technician may identify a relationship between the performance metrics (which are indicative of the service issue) and the configuration of the content delivery network 112. In the example illustrated in FIG. 2, because the network data 144 (e.g., the graphical illustrations of the network cables and the labels of the network cables) are displayed with the visual representation of the geographic data 142, the technician may be able to quickly ascertain that the components that are likely experiencing the same service issue are all connected to a particular network cable (e.g., the T-09 network cable in FIG. 2). Based on this information, the technician may be able to determine a plan to address the service issue, such as performing repairs to the particular network cable (e.g., the T-9 network cable). Thus, the display 200 of FIG. 2 may enable a technician to quickly determine a plan to address a service issue without performing time-consuming processing of the performance data 130 and without performing time-consuming testing at a particular address or testing on a network card associated with the particular network cable.

Referring to FIG. 3, a diagram illustrating a particular implementation of a user interface displayed by a network analysis device (such as the mobile network analysis device 108 of FIG. 1) is shown and generally designated 300. In a particular implementation, the user interface 300 may be generated and displayed via the mobile network analysis device 108 or the network analyzer 104 of FIG. 1. The user interface 300 is configured to display information to the technician and to enable the technician to select parameters, to adjust values, and to initiate data processing of performance data. For example, the technician may use a user input device of the mobile network analysis device 108 to select parameters or to adjust values displayed via the user interface 300. In some implementations, initiating processing of the performance data may cause the mobile network analysis device 108 to generate the display 160 of FIG. 1 or the display 200 of FIG. 2. Additionally, initiating processing of the performance data may cause the mobile network analysis device 108 to generate a report.

The user interface 300 may include multiple selectable parameters for use in generating a search query used to retrieve performance data. In the example of FIG. 3, the parameters include a location parameter (e.g., "Just the Neighborhoods I Loaded"), a time threshold (e.g., "Limit Data to Last 48 Hours"), an outlier parameter (e.g., "Outlier Threshold: 3 Standard Deviations for Bursty FECs"), a measurement parameter (e.g., "Target Stat Threshold: 0 Limits Applicable Query to Results Above This Value"), and a unit parameter (e.g., "Size of Time Bucket: 5 Hours for Neighborhood Re-Initializations"). The location parameter enables a technician to limit the retrieval and processing of performance data to neighborhoods that are specifically loaded by the technician (e.g., using a different tab of the user interface 300). The time threshold enables the technician to limit the retrieval and processing of performance data to performance data that is measured during a particular time period, such as the time period 154 of FIG. 1. The outlier parameter enables the technician to select a number of standard deviations used to define statistical outliers. The measurement parameter enables the technician to set a threshold for a particular measurement. The unit parameter enables the technician to select a time unit for use in displaying results of the data processing. Although the example illustrated in FIG. 3 shows five parameters, in other implementations fewer than five or more than five parameters may be included in the user interface 300. In the example illustrated in FIG. 3, each of the parameters are selectable using a check box, and each value is adjustable using up and down arrows. In other implementations, the parameters may be selected and adjusted using other techniques.

Additionally, the user interface 300 may include one or more selectable indicators (e.g., buttons) that enable the technician to select a particular measurement. The retrieved performance data is to be filtered by the particular measurement. In the example illustrated in FIG. 3, the user interface 300 includes a selectable indicator for "Bursty FECs," a selectable indicator for "Neighborhood Re-Initializations," and a selectable indicator for "Dump All" (e.g., an indicator to export the retrieved performance data into a spreadsheet for by-hand analysis). If the technician selects one of the selectable indicators, the mobile network analysis device 108 may generate a search query (e.g., the search query 150) based on the information received via the user interface 300, and the search query may be used to access the database 102 to retrieve a portion of the performance data 130, as further described with reference to FIG. 1. The retrieved portion of the performance data 130 may be used to generate a display, as further described with reference to FIGS. 1 and 2. Additionally or alternatively, the retrieved portion of the performance data 130 may be used to generate a report in accordance with the parameters and values selected using the user interface 300. Although three selectable indicators are illustrated in FIG. 3, in other implementations, the user interface 300 may include more than three or fewer than three selectable indicators, and the selectable indicators may be associated with different options (e.g., different performance measurements).

In a particular implementation, the user interface 300 may use other input to generate a search query. For example, a search query may be based on a GPS location of the mobile network analysis device 108 or data provided to a dispatch application that indicates information related to service calls. Additionally or alternatively, the search query may be generated based on other data or other options. In other implementations, the search query may be generated based on more options or fewer options than described with reference to FIG. 3.

Thus, the user interface 300 of FIG. 3 enables a technician to quickly and easy generate a search query based on the technician's needs. For example, the technician may select a particular address associated with a service call, and for a geographic region that includes the particular address, the technician may be provided with a report (and a visual display) of selected performance metrics for a selected time period. Such information may enable the technician to quickly and easily identify whether a service issue effecting a component at the particular address is also likely effecting other components in the geographic region.

Figure 4:
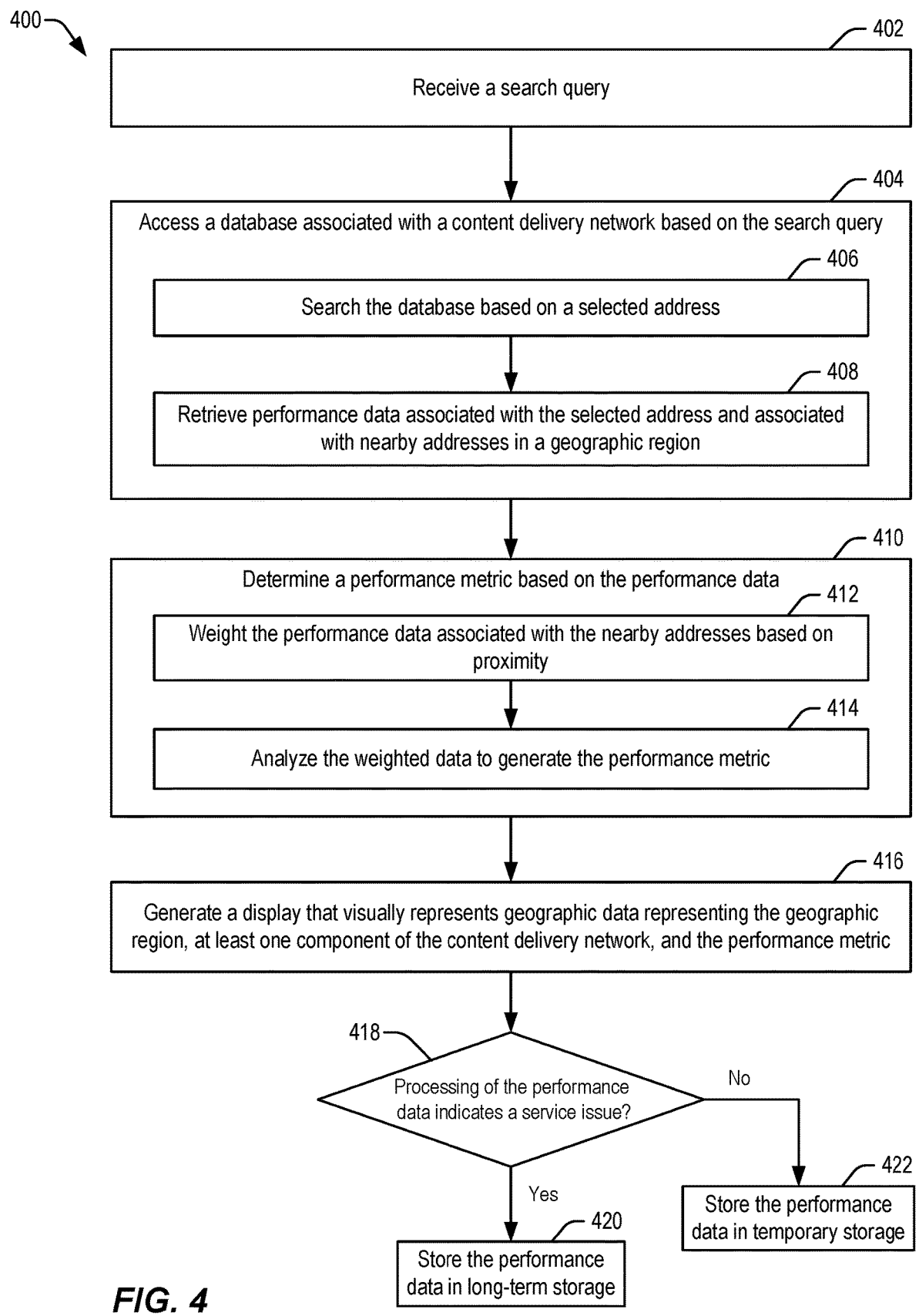
FIG. 4 is a flowchart of an illustrative implementation of a method of analyzing performance data and generating a display based on a performance metric.

Referring to FIG. 4, a particular illustrative example of a method of analyzing performance data and generating a display based on a performance metric is depicted and generally designated 400. The method 400 may be performed at one or more devices of a content delivery network. As an illustrative, non-limiting example, the method 400 may be performed by the network analyzer 104, the mobile network analysis device 108, or both, of FIG. 1.

The method 400 may include receiving a search query, at 402. For example, with reference to FIG. 1, the network analyzer 104 may receive the search query 150 from the mobile network analysis device 108. The search query 150 may indicate the address 152 and the time period 154, which may be entered by a technician into the mobile network analysis device 108 in response to the user interface 300 of FIG. 3.

The method 400 may include accessing a database associated with a content delivery network based on the search query, at 404. For example, with reference to FIG. 1, the network analyzer 104 may access the database 102 based on the search query 150 to retrieve a portion of the performance data 130. In some implementations, the method 400 includes searching the database based on an address, at 406. For example, the network analyzer 104 may search the performance data 130 for performance data related to a component (or components) of the content delivery network 112 that is located at (or associated with) the address 152. Additionally, the network analyzer 104 may search the performance data 130 for performance data related to components that are associated with nearby addresses in a geographic region. For example, if the address 152 is an address of the first RG 120, the network analyzer 104 may search for performance data related to the components (e.g., the first RG 120, the second RG 122, the third RG 124, and the first node 116) that are located within the geographic region 170.

In a particular implementation, the network analyzer 104 may determine the nearby addresses based on physical distance from the address. In another particular implementation, the network analyzer 104 may identify the nearby addresses based on location in a common region, such as a neighborhood, a sub-division, a city, a county, a state, or another region. Additionally or alternatively, the network analyzer 104 may determine the nearby addresses based on a logical distance from the address. For example, the network analyzer 104 may determine the nearby addresses based on a hop count from the component associated with the address, based on a connection to a common network component (e.g., a node, a particular network cable, etc.), based on a grouping defined in the network data 144, or some other logical distance. The determination may be based on a default setting of the network analyzer 104 or may be set by the technician. In some implementations, the method 400 includes retrieving performance data associated with the address and associated with nearby addresses in a geographic region, at 408. For example, the network analyzer 104 may retrieve performance data related to components (e.g., the first RG 120, the second RG 122, the third RG 124, and the first node 116) that are associated with the geographic region 170.

The method 400 may include determining a performance metric based on the performance data, at 410. For example, with reference to FIG. 1, the network analyzer 104 may determine the performance metric 132 based on the retrieved portion of the performance data 130. In some implementations, the method 400 includes weighting the performance data associated with the nearby addresses based on proximity, at 412. For example, the network analyzer 104 may weight the retrieved portion of the performance data 130 to generate the weighted performance data 134. As a particular example, the network analyzer 104 may weight the data associated with components that are nearby to the address 152 higher than data associated with components that are farther away from the address 152. In some implementations, the method 400 includes analyzing the weighted data to generate the performance metric, at 414. For example, the network analyzer 104 may analyze the weighted performance data 134 to generate the performance metric 132. As described with reference to FIG. 1, analyzing the retrieved portion of the performance data 130 (or the weighted performance data 134) may include performing a threshold analysis, performing an outlier analysis, identifying time-correlated events, identifying a performance trend, or a combination thereof.

The method 400 may include generating a display that visually represents geographic data of the geographic region, at least one component of the content delivery network, and the performance network, at 416. For example, the network analyzer 104 may transmit the message 140 to the mobile network analysis device 108. The message 140 may include the performance metric 132, the geographic data 142, and the network data 144. Alternatively, the message 140 may indicate (e.g., may point to) locations of the performance metric 132, the geographic data 142, and the network data 144, and the mobile network analysis device 108 may retrieve the performance metric 132, the geographic data 142, and the network data 144 based on the message 140. The mobile network analysis device 108 may generate the display 160 that visually represents the geographic data 142, the at least one component 162 (based on network data 144), and the performance metric 132. An example of the display is illustrated in FIG. 2.

The method 400 may include determining whether processing of the performance data indicates a service issue, at 418. For example, with reference to FIG. 1, the network analyzer 104 may determine whether the performance metric 132 is associated with a measurement that exceeds a threshold or that is a statistical outlier as compared to other measurements, which may indicate that components within the geographic region 170 are experiencing a service issue. When the processing indicates that the components are experiencing a service issue, the method 400 continues to 420, where the performance data is stored in long term storage. For example, the network analyzer 104 may store the retrieved portion of the performance data 130 in the long-term storage 136 when the processing indicates that the components of the geographic region 170 are experiencing a service issue. The retrieved portion of the performance data 130 may be stored in the long-term storage 136 for use in additional processing. When the processing indicates that the components fail to experience a service issue, the method 400 continues to 422, where the performance data is stored in temporary storage (or the performance data is discarded). For example, the network analyzer 104 may store the retrieved portion of the performance data 130 in the temporary storage 138 (or the retrieved portion of the performance data 130 is discarded) when the processing indicates that the components of the geographic region 170 fail to experience a service issue.

Thus, the method 400 of FIG. 4 processes performance data to identify a performance metric and initiates a display to a technician that visually represents geographic data, at least one component of a content delivery network, and the performance metric. Processing of the performance data may indicate whether components of a content delivery network that are within a geographic region are experiencing a service issue. The display may enable the technician to quickly and easily identify whether a service issue effecting a component at a particular address is also likely effecting other components in the geographic region. Additionally, performance data that is indicative of a service issue may be stored in long-term storage, while performance data that is not indicative of a service issue may be stored in temporary storage (or discarded) to make room for new performance data.

Figure 5:
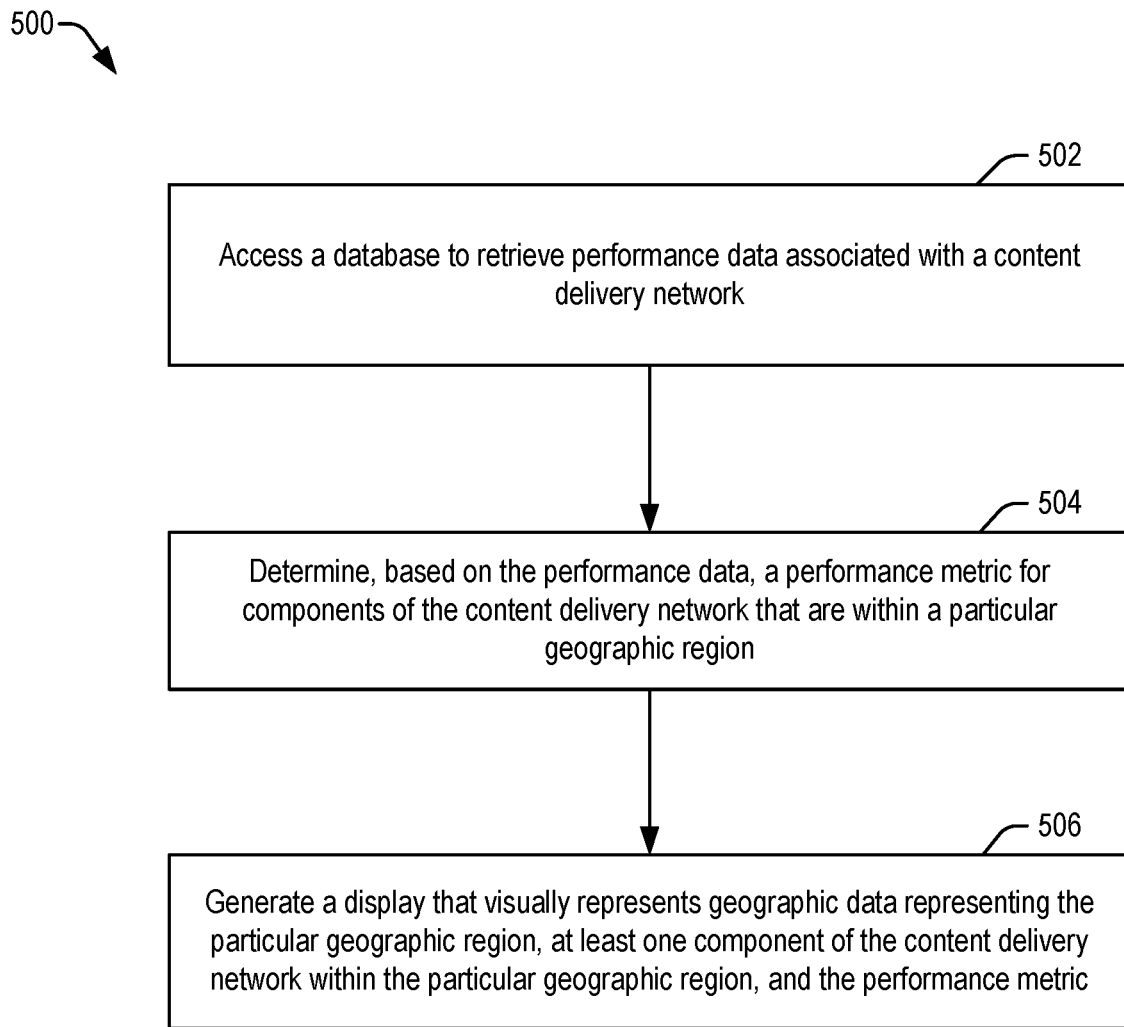
FIG. 5 is a flowchart of an illustrative implementation of a method of generating a display based on a performance metric.

Referring to FIG. 5, a particular illustrative example of a method of generating a display based on a performance metric is depicted and generally designated 500. The method 500 may be performed at one or more devices of a content delivery network. As an illustrative, non-limiting example, the method 500 may be performed by the network analyzer 104, the mobile network analysis device 108, or both, of FIG. 1.

The method 500 may include accessing a database to retrieve performance data associated with a content delivery network, at 502. For example, with reference to FIG. 1, the network analyzer 104 may access the database 102 to retrieve a portion of the performance data 130 associated with the content delivery network 112. The performance data 130 may indicate a count of error corrections, a count of re-initializations, a count of code violations, a count of error seconds, a count of unavailable seconds, or a combination thereof, for components of the content delivery network 112.

The method 500 may include determining, based on the performance data, a performance metric for components of the content delivery network that are within a particular geographic region. For example, with reference to FIG. 1, the network analyzer 104 may determine, based on the retrieved portion of the performance data 130, the performance metric 132. The performance metric 132 may be associated with components of the content delivery network 112 that are located within the geographic region 170. In a particular implementation, determining the performance metric includes identifying a service issue within the particular geographic region based on a statistical analysis of portions of the performance data. For example, a service issue may be identified for the components that are within the geographic region 170 based on a statistical analysis of the retrieved portion of the performance data 130.

The method 500 may further include generating a display, at 506. The display visually represents geographic data representing the particular geographic region, at least one component of the content delivery network within the particular geographic region, and the performance metric. To illustrate, the mobile network analysis device 108 may generate the display 160 that visually represents the geographic data 142, the at least one component 162, and the performance metric 132.

In a particular implementation, the at least one component 162 includes a network cable, a residential gateway, a node, a hub, a wireless transmitter, a tap, or a combination thereof. Information associated with the at least one component 162 may be provided by the network data 144, which may locations of components, such as network cables, of the content delivery network 112 within the geographic region 170, interconnections between the components, or both. In implementations where the at least one component 162 includes a network cable, the display 160 may indicate whether the network cables are buried or above-ground. To illustrate, with reference to FIG. 2, graphical illustrations of network cables of the content delivery network 112 may be illustrated in the display 200. Formatting of graphical illustrations of above-ground network cables may be different from formatting to graphical illustrations of buried network cables.

In a particular implementation, a visual representation of the geographic data 142 may include a satellite image (e.g., photo) of the geographic region 170. Alternatively, a visual representation of the geographic data 142 may include a map (e.g., a street map) of the geographic region 170. The geographic data 142 may include image data of a satellite photo of the geographic region 170, image data of a street map of the geographic region 170, data that indicates addresses of locations, data that indicates GPS coordinates of locations, or a combination thereof.

In a particular implementation, the display 160 visually represents a combination of the geographic data 142, the at least one component 162, and the performance metric 132. For example, visual representations or information corresponding to the geographic data 142, the at least one component 162, and the performance metric may be displayed in different portions of the display 160. Alternatively, the performance metric 132 and a visual representation of the at least one component 162 may be overlaid on an image that visually represents the geographic data 142. For example, the performance metrics 202 and 204 and the visual representations of the network cables may be overlaid on an image of a neighborhood, as illustrated in FIG. 2.

In another particular implementation, accessing the database 102 includes searching the database 102 based on the address 152, determining additional addresses within the geographic region 170 based on a distance to the address 152 or a logical grouping of components of the content delivery network 112, and retrieving the performance data 130 (e.g., a portion thereof) based on the address 152 and the additional addresses. For example, the network analyzer 104 may search the database 102 for a portion of the performance data 130 that is related to a component associated with the address 152, and the network analyzer 104 may retrieve the portion of the performance data 130. The retrieved performance data 130 may include data associated with the address 152 and data associated with nearby addresses within the geographic region 170. For example, in addition to retrieving a portion of the performance data 130 that is related to the component associated with the address 152, the network analyzer 104 may also retrieve a portion of the performance data 130 that is related to components associated with nearby addresses (to the address 152) or with addresses that are associated with components that have a common logical grouping (e.g., components that are coupled to a same component, such as a network cable, or components that are indicated as related by the network data 144). Additionally, the method 500 may include weighting the data associated with the additional addresses based on proximity of the additional addresses to the address 152 (e.g., to generate the weighted performance data 134), and analyzing the weighted performance data 134 to generate the performance metric 132. For example, the network analyzer 104 may perform a statistical analysis on the weighted data (e.g., the retrieved portion of the performance data 130) to determine the performance metric 132, as described with reference to FIG. 1.

In another particular implementation, the method 500 includes initiating the display 160 at the mobile network analysis device 108. For example, the network analyzer 104 may transmit the message 140 to the mobile network analysis device 108 to cause the mobile network analysis device 108 to initiate the display 160. Additionally or alternatively, the performance data 130 is retrieved in response to the search query 150. For example, the network analyzer 104 may receive the search query 150 from the mobile network analysis device 108, and the network analyzer 104 may retrieve a portion of the performance data 130 based on the search query 150 (e.g., based on the address 152 and the time period 154 included in the search query 150). A parameter of the search query 150 may include a particular event, a particular location (e.g., the address 152), a particular component of the content delivery network 112, a particular component type, or a combination thereof. Parameters of the search query 150 may be selectable or adjustable by a technician using the user interface 300 of FIG. 3.

In another particular implementation, determining the performance metric 132 includes analyzing the performance data 130 (or a portion thereof) to identify time-correlated events. For example, the network analyzer 104 may analyze the retrieved portion of the performance data 130 to identify time-correlated events. Additionally, the performance metric 132 may be visually represented by an icon (e.g., the first icon 166, the second icon 168, or the icon 206) that is associated with at least one of the time-correlated events.

In another particular implementation, the performance metric 132 indicates a number of occurrences of an event at a subset of the components, and the number of occurrences for each component of the subset is indicated by the display 160 (or the display 200). For example, with reference to FIG. 2, the first performance metric 202 indicates a number of occurrences of FECs at a particular component, and the number of occurrences (e.g., 18 FECs) is depicted as shown in FIG. 2. The event may include a service call, a customer request, a performance measurement that exceeds a threshold, a performance measurement that is a statistical outlier as compared to performance measurements of other components within the geographic region 170 (or network-wide), or a combination thereof. Additionally, the number of occurrences may be determined for a specified time period. For example, the number of occurrences of an event may be determined for the time period 154, which is entered by a technician at the mobile network analysis device 108.

In another particular implementation, the method 500 includes processing the performance data 130 (or a portion thereof) to identify a performance trend associated with the performance data 130, outliers associated with the performance data 130, data elements of the performance data 130 that exceed a threshold, or a combination thereof. For example, the network analyzer 104 may process the retrieved portion of the performance data 130 to identify measurements that exceed (or fail to exceed) a threshold, as described with reference to FIG. 1. As another example, the network analyzer 104 may process the retrieved portion of the performance data 130 to identify measurements that are statistical outliers as compared to measurements of other components within the geographic region 170, as described with reference to FIG. 1. As another example, the network analyzer 104 may identify a performance trend (e.g., a change in an occurrence rate of an event) based on the retrieved portion of the performance data 130, as described with reference to FIG. 1.

In another particular implementation, the method 500 includes storing the performance data 130 (e.g., the retrieved portion) at a memory location associated with long-term storage when the processing of the performance data 130 indicates a service issue with the components that are within the geographic region 170. For example, the network analyzer 104 may store the retrieved portion of the performance data 130 in the long-term storage 136 when the processing of the retrieved portion of the performance data 130 indicates a service issue is being experienced by the components within the geographic region 170. Additionally or alternatively, the method 500 includes storing the performance data 130 (e.g., the retrieved portion) at a memory location associated with temporary storage when the processing of the performance data 130 fails to indicate a service issue with the components that are within the geographic region 170. For example, the network analyzer 104 may store the retrieved portion of the performance data 130 in the temporary storage 138 when the processing of the retrieved portion of the performance data 130 fails to indicate that a service issue is being experienced by the components within the geographic region 170. Alternatively, the network analyzer 104 may discard the retrieved portion of the performance data 130 when the processing of the retrieved portion of the performance data 130 fails to indicate that a service issue is being experienced by the components within the geographic region 170.

Thus, the method 500 of FIG. 5 generates a display that visually represents geographic data representing a geographic region, at least one component of a content delivery network, and a performance metric. The display enables a technician to quickly and easy identify whether a service issue effecting a component at a particular address is also likely effecting other components in the geographic region. Thus, the technician may make a more effective plan to address the service issue than by performing time consuming testing at the particular address.

Figure 6:
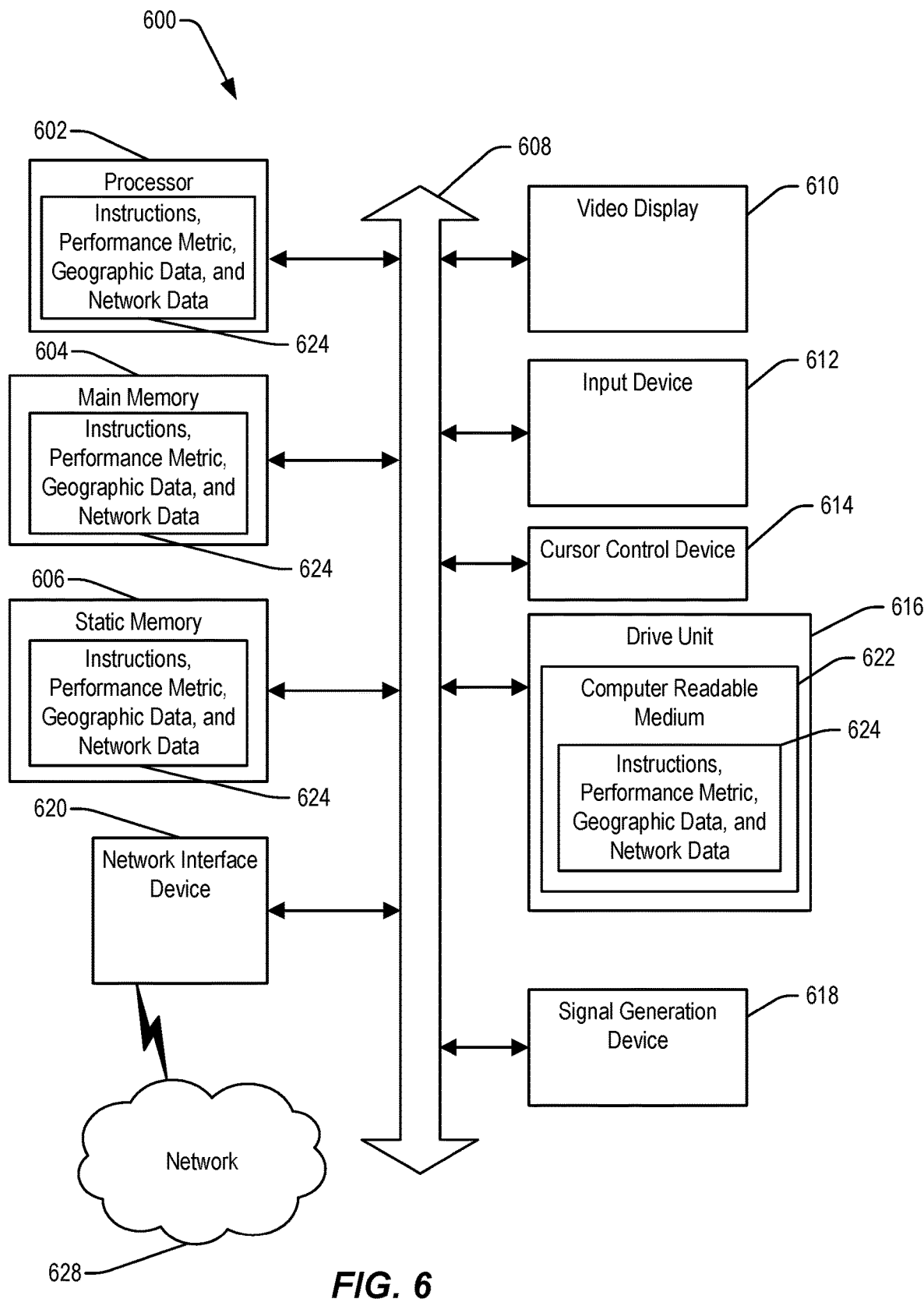
FIG. 6 is a block diagram of an illustrative implementation of a computer system supporting various aspects of method(s), system(s), apparatus(es), and/or computer-readable media disclosed herein.

Referring to FIG. 6, an illustrative implementation of a computer system is shown and is designated 600. The computer system 600 includes a set of instructions that can be executed to cause the computer system 600 to perform any one or more of the methods or computer based functions disclosed herein. The computer system 600 may operate as a standalone device or may be connected (e.g., using a network), to other computer systems or peripheral devices. For example, the computer system 600 may include or be included within any one or more of the network analyzer 104 or the mobile network analysis device 108 of FIG. 1.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a server, a network device, mobile device, a palmtop computer, a laptop computer, a desktop computer, a communications device, a wireless telephone, a personal computer (PC), a tablet PC, a personal digital assistant (PDA), a set-top box (STB), a media playback device, a customer premises equipment device, an endpoint device, a web appliance, a vehicle (e.g., the computer system 600 may be mounted within the vehicle or incorporated in a component of the vehicle, such as a control display unit), or any other machine capable of executing a set of instructions (sequential or otherwise) that specify actions to be taken by that machine. In a particular implementation, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a light emitting diode (LED) display, a touch screen display, a flat panel display, a solid state display, or a lamp assembly of a projection system. Additionally, the computer system 600 may include an input device 612, such as a remote control device (e.g., a television remote or a set-top box remote), a keyboard, a joystick, another input device, or combinations thereof. In addition, the computer system 600 may include a cursor control device 614, such as a mouse. In some embodiments, the input device 612 and the cursor control device 614 may be integrated into a single device, such as a capacitive touch screen input device. The computer system 600 may also include a drive unit 616, a signal generation device 618, such as a speaker or remote control, and a network interface device 620. Some computer systems 600 may not include an input device (e.g., a server may not include an input device).

In a particular implementation, as depicted in FIG. 6, the drive unit 616 may include a computer-readable storage device 622 in which a performance metric, geographic data, network data (of a content delivery network), and one or more sets of instructions 624, e.g. software, can be embedded. The computer-readable storage device 622 may be random access memory (RAM), read-only memory (ROM), programmable read-only memory (PROM), erasable PROM (EPROM), electrically erasable PROM (EEPROM), register (s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. A computer-readable storage device is not a signal.

Further, the instructions 624 may embody one or more of the methods or logic as described herein. The instructions 624 may be executable by the processor 602 to perform one or more functions or methods described herein, such as the method 400 of FIG. 4 of the method 500 of FIG. 5. In a particular implementation, the performance metric, the geographic data, the network data, and the instructions 624 may reside completely, or at least partially, within the main memory 604, the static memory 606, and/or within the processor 602 during execution by the computer system 600. The main memory 604 and the processor 602 also may include a computer-readable storage device. The performance metric, the geographic data, and the network data in the drive unit 616, the main memory 604, the static memory 606, the processor 602, or combinations thereof may be used to generate a display, e.g., at the video display unit 610, that visually represents the network data and the performance metric overlaid on the geographic data.

In a particular implementation, the instructions 624 may be executable by the processor 602 to obtain performance data associated with a content delivery network. The instructions 624 may be executable by the processor 602 to determine, based on the performance data, a performance metric for components of the content delivery network that are within a particular geographic region. The instructions 624 may be further executable by the processor 602 to generate a display (e.g., at the video display unit 610) that visually represents the geographic data (representing the particular geographic region), at least one component of the content delivery network within the particular geographic region (based on the network data), and the performance metric.

In an alternative implementation, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes the computer-readable storage device 622 that stores the instructions 624 or receives, stores and executes the instructions 624, so that a device connected to a network 628 may communicate voice, video or data over the network 628. While the computer-readable storage device 622 is shown to be a single device, the computer-readable storage device 622 may include a single device or multiple devices, such as a centralized or distributed database, and/or associated caches and servers that store one or more sets of instructions. The computer-readable storage device 622 is capable of storing a set of instructions for execution by a processor to cause a computer system to perform any one or more of the methods or operations disclosed herein. For example, the computer-readable storage device 622 may store instructions for execution by a processor to cause a computer system to perform the method 400 of FIG. 4 or the method 500 of FIG. 5.

In a particular non-limiting, exemplary implementation, the computer-readable storage device 622 may include a solid-state memory such as embedded memory (or a memory card or other package that houses one or more non-volatile read-only memories). Further, the computer-readable storage device 622 may be a random access memory or other volatile re-writable memory. Additionally, the computer-readable storage device 622 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
accessing a database to retrieve performance data associated with a content delivery network, wherein accessing the database comprises:
identifying a first component of the content delivery network based on a first criterion; and
identifying a second component of the content delivery network based on the first component, wherein the second component and the first component are coupled to a content server via a common component of the content delivery network;
determining, based on the performance data, performance metrics for components of the content delivery network that are within a particular geographic region, the components of the content delivery network including the first component and the second component; and
generating a display that visually represents:
an image representing the particular geographic region;
the first component;
the second component;
the common component; and
the performance metrics, wherein the performance metrics comprise a numeric value that is displayed on the image near at a location that corresponds to a corresponding component, and wherein an icon is placed at each location associated with a component having a performance metric that fails to satisfy a threshold.

2. The method of claim 1, wherein the performance metrics include a first performance metric corresponding to the first component and a second performance metric corresponding to the second component, and wherein the display visually represents the first performance metric and the second performance metric.

3. The method of claim 1, wherein the common component includes a network cable, and wherein the display indicates whether the network cable is buried or aboveground.

4. The method of claim 1, wherein the image includes a satellite image of the particular geographic region.

5. The method of claim 1, wherein the image includes a satellite photo of the particular geographic region or an image of a street map of the particular geographic region, and wherein the image is further displayed with addresses of locations, global positioning satellite (GPS) coordinates of locations, or a combination thereof.

6. The method of claim 1, wherein accessing the database comprises:
searching the database based on an address, wherein the first component is identified based on the address;
determining additional addresses within the particular geographic region based on a distance to a location corresponding to the address or a logical grouping of components of the content delivery network, wherein the second component is associated with a second address of the additional addresses; and
retrieving the performance data for the address and the additional addresses.

7. The method of claim 6, further comprising:
weighting the performance data associated with the additional addresses based on proximity of locations corresponding to the additional addresses to the location corresponding to the address to generate weighted data; and
analyzing the weighted data to generate the performance metric.

8. The method of claim 1, wherein the performance data indicates a count of error corrections, a count of re-initializations, a count of code violations, a count of error seconds, a count of unavailable seconds, or a combination thereof.

9. The method of claim 1, wherein the performance data is retrieved in response to a search query, and wherein a parameter of the search query indicates a particular event, a particular location, a particular component of the content delivery network, a component type, a time period, or a combination thereof.

10. The method of claim 1, further comprising the display is generated at a mobile network analysis device.

11. The method of claim 1, wherein at least one of the performance metrics indicates a performance measurement that is a statistical outlier as compared to performance measurements of other components of the content delivery network within the particular geographic region.

12. The method of claim 1, wherein the performance metrics are based on weighted performance data associated with other components of the content delivery network within the particular geographic region, and wherein weights of the weighted performance data are based on distances between the first component and the other components.

13. An apparatus comprising:
   a processor;
   a display device; and
   a memory accessible to the processor, the memory comprising instructions executable by the processor to perform operations comprising:
      accessing a database to retrieve performance data associated with a content delivery network, wherein accessing the database comprises:
         identifying a first component of the content delivery network based on a first criterion; and
         identifying a second component of the content delivery network based on the first component, wherein the second component and the first component are coupled to a content server via a common component of the content delivery network;
      determining, based on the performance data, performance metrics for components of the content delivery network that are within a particular geographic region, the components of the content delivery network including the first component and the second component; and
      generating, at the display device, a display that visually represents:
         an image representing the particular geographic region;
         the first component;
         the second component;
         the common component; and
         the performance metrics, wherein the performance metrics comprise a numeric value that is displayed on the image near at a location that corresponds to a corresponding component, and wherein an icon is placed at each location associated with a component having a performance metric that fails to satisfy a threshold.

14. The apparatus of claim 13, wherein determining the performance metrics includes analyzing the performance data to identify time-correlated events.

15. The apparatus of claim 13, wherein at least one of the performance metrics indicates a number of occurrences of an event at a subset of the components, and wherein the number of occurrences for each component of the subset is indicated by the display.

16. The apparatus of claim 15, wherein the event includes a service call, a customer request, a performance measurement that exceeds a threshold, a performance measurement that is a statistical outlier as compared to performance measurements of other components within the particular geographic region, or a combination thereof.

17. A computer-readable storage device storing instructions that, when executed by a processor, cause the processor to perform operations comprising:
   accessing a database to retrieve performance data associated with a content delivery network, wherein accessing the database comprises:
      identifying a first component of the content delivery network based on a first criterion; and
      identifying a second component of the content delivery network based on the first component, wherein the second component and the first component are coupled to a content server via a common component of the content delivery network;
   determining, based on the performance data, performance metrics for components of the content delivery network that are within a particular geographic region, the components of the content delivery network including the first component and the second component; and
   generating a display that visually represents:
      an image representing the particular geographic region;
      the first component;
      the second component;
      the common component; and
      the performance metrics, wherein the performance metrics comprise a numeric value that is displayed on the image near at a location that corresponds to a corresponding component, and wherein an icon is placed at each location associated with a component having a performance metric that fails to satisfy a threshold.

18. The computer-readable storage device of claim 17, wherein the operations further comprise processing the performance data to identify a performance trend associated with the performance data, outliers associated with the performance data, data elements of the performance data that exceed a threshold, or a combination thereof.

19. The computer-readable storage device of claim 18, wherein the operations further comprise storing the performance data at a memory location associated with long-term storage when the processing of the performance data indicates a service issue with the components that are within the particular geographic region.

20. The computer-readable storage device of claim 18, wherein the operations further comprise storing the performance data at a memory location associated with temporary storage when the processing of the performance data fails to indicate a service issue with the components that are within the particular geographic region.

* * * * *

UNITED STATES PATENT AND TRADEMARK OFFICE
CERTIFICATE OF CORRECTION

PATENT NO. : 10,567,246 B2  
APPLICATION NO. : 14/970179  
DATED : February 18, 2020  
INVENTOR(S) : Randolph et al.

Page 1 of 2

It is certified that error appears in the above-identified patent and that said Letters Patent is hereby corrected as shown below:

In the Claims

Column 29, Line 45, In Claim 1: should read as follows:
A method comprising:
accessing a database to retrieve performance data associated with a content delivery network, wherein accessing the database comprises:
identifying a first component of the content delivery network based on a first criterion; and
identifying a second component of the content delivery network based on the first component, wherein the second component and the first component are coupled to a content server via a common component of the content delivery network;
determining, based on the performance data, performance metrics for components of the content delivery network that are within a particular geographic region, the components of the content delivery network including the first component and the second component; and
generating a display that visually represents:
an image representing the particular geographic region;
the first component;
the second component;
the common component; and
the performance metrics, wherein the performance metrics comprise a numeric value that is displayed on the image near a location that corresponds to a corresponding component, and wherein an icon is placed at each location associated with a component having a performance metric that fails to satisfy a threshold.

Column 32, Line 1, In Claim 17: should read as follows:
A computer-readable storage device storing instructions that, when executed by a processor, cause the processor to perform operations comprising:
accessing a database to retrieve performance data associated with a content delivery network, wherein accessing the database comprises:
identifying a first component of the content delivery network based on a first criterion; and Signed and Sealed this  
Twenty-eighth Day of July, 2020

Andrei Iancu  
*Director of the United States Patent and Trademark Office* identifying a second component of the content delivery network based on the first component, wherein the second component and the first component are coupled to a content server via a common component of the content delivery network;

determining, based on the performance data, performance metrics for components of the content delivery network that are within a particular geographic region, the components of the content delivery network including the first component and the second component; and generating a display that visually represents:

an image representing the particular geographic region;

the first component;

the second component;

the common component; and the performance metrics, wherein the performance metrics comprise a numeric value that is displayed on the image near a location that corresponds to a corresponding component, and wherein an icon is placed at each location associated with a component having a performance metric that fails to satisfy a threshold.